O. C. HOUGHTON.
COTTON HARVESTER.
APPLICATION FILED AUG. 1, 1910.
979,859.
Patented Dec. 27, 1910.
4 SHEETS—SHEET 1.
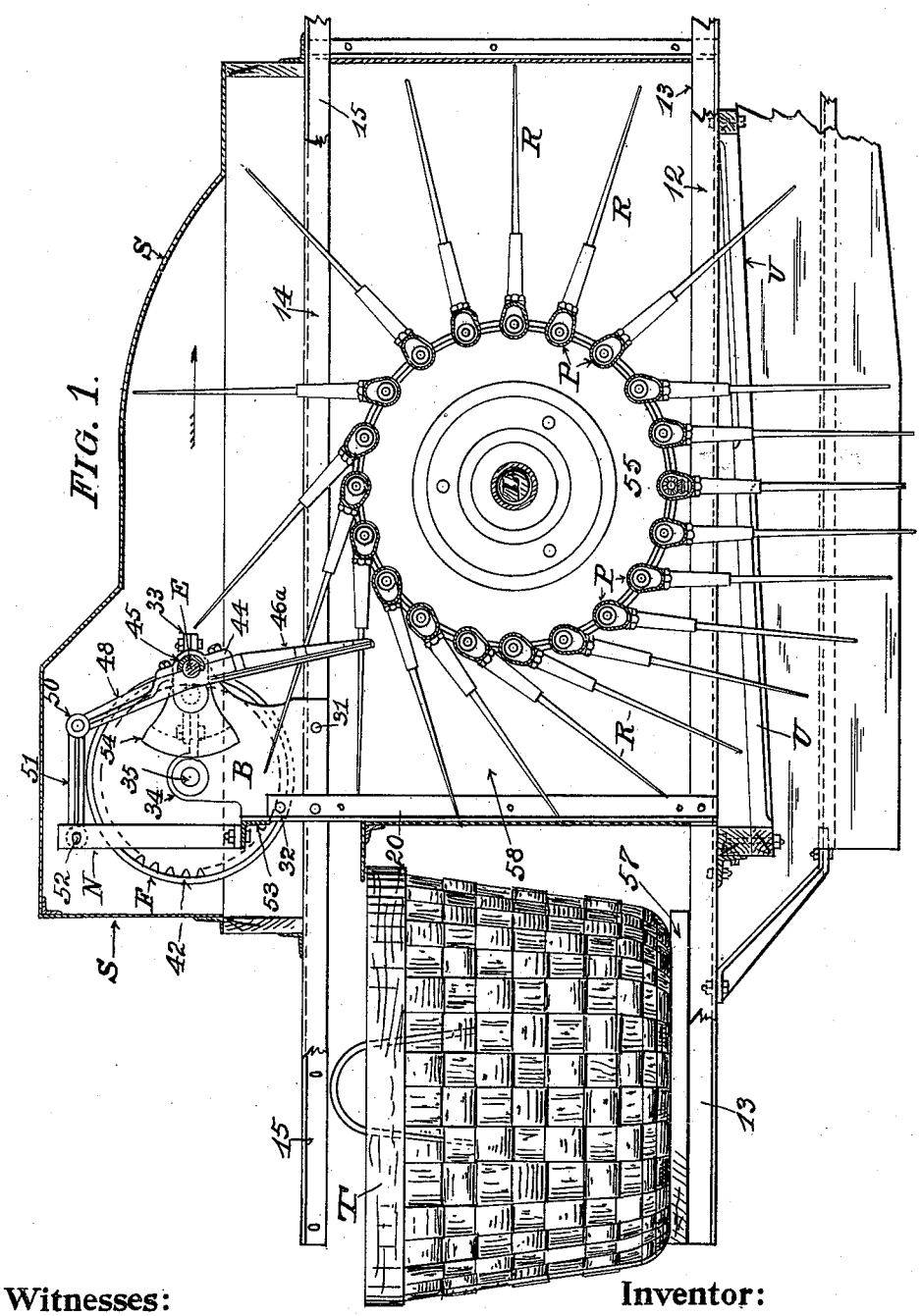
Witnesses:
C. B. Knudsen
A. S. Peterson
Inventor:
Orley C. Houghton
By Michael J. Stark & Sons,
Attorneys.

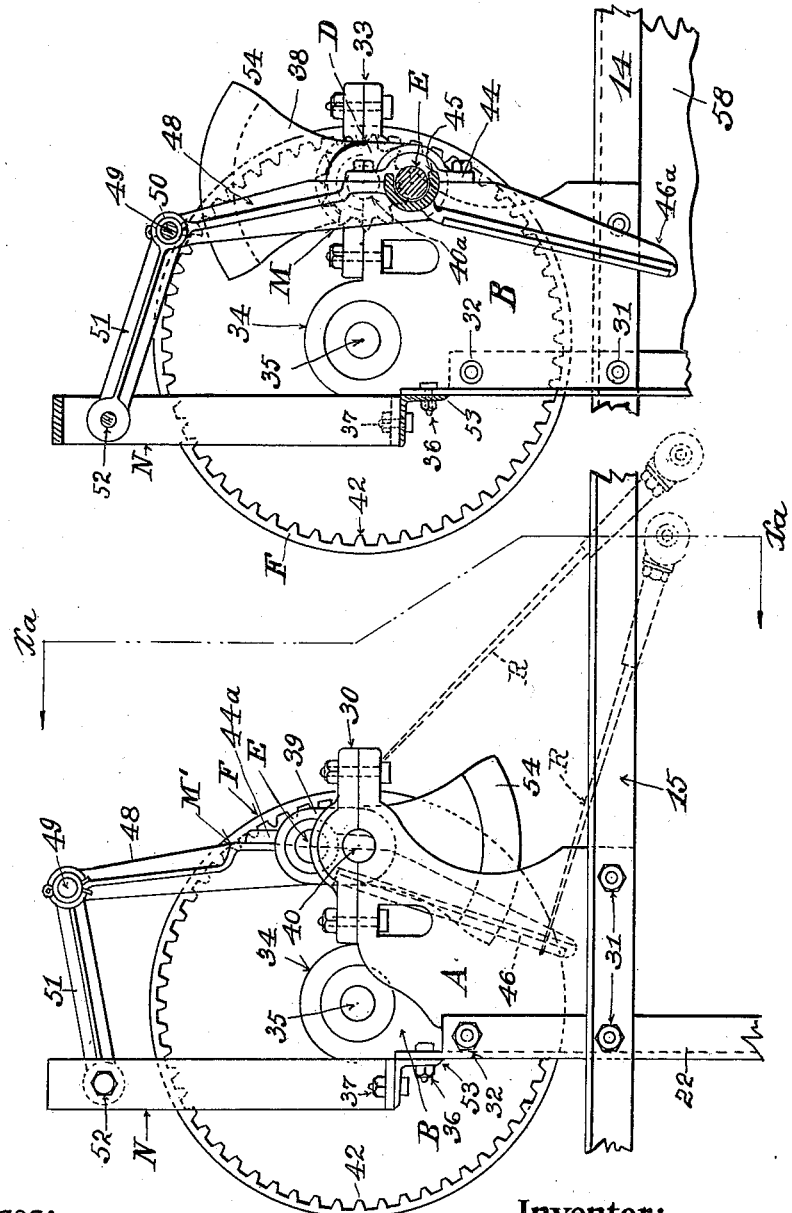

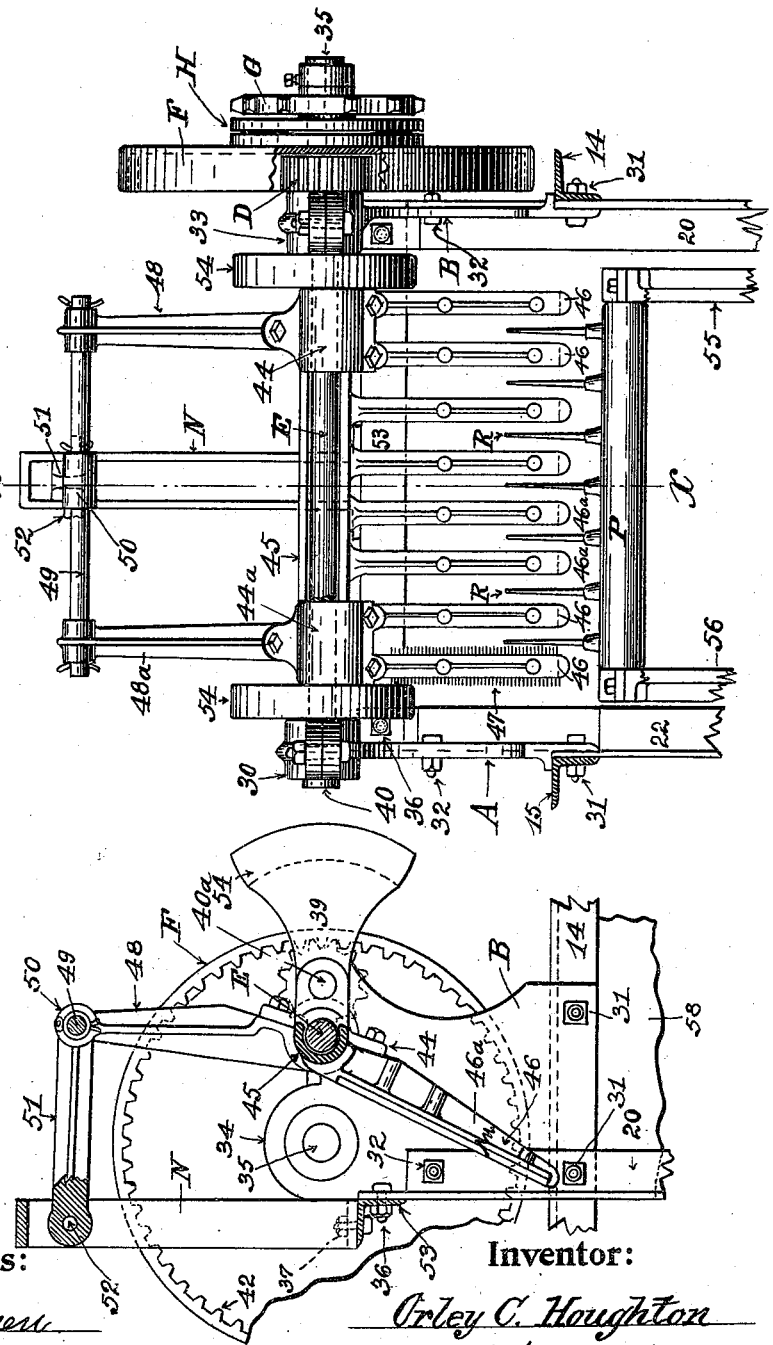

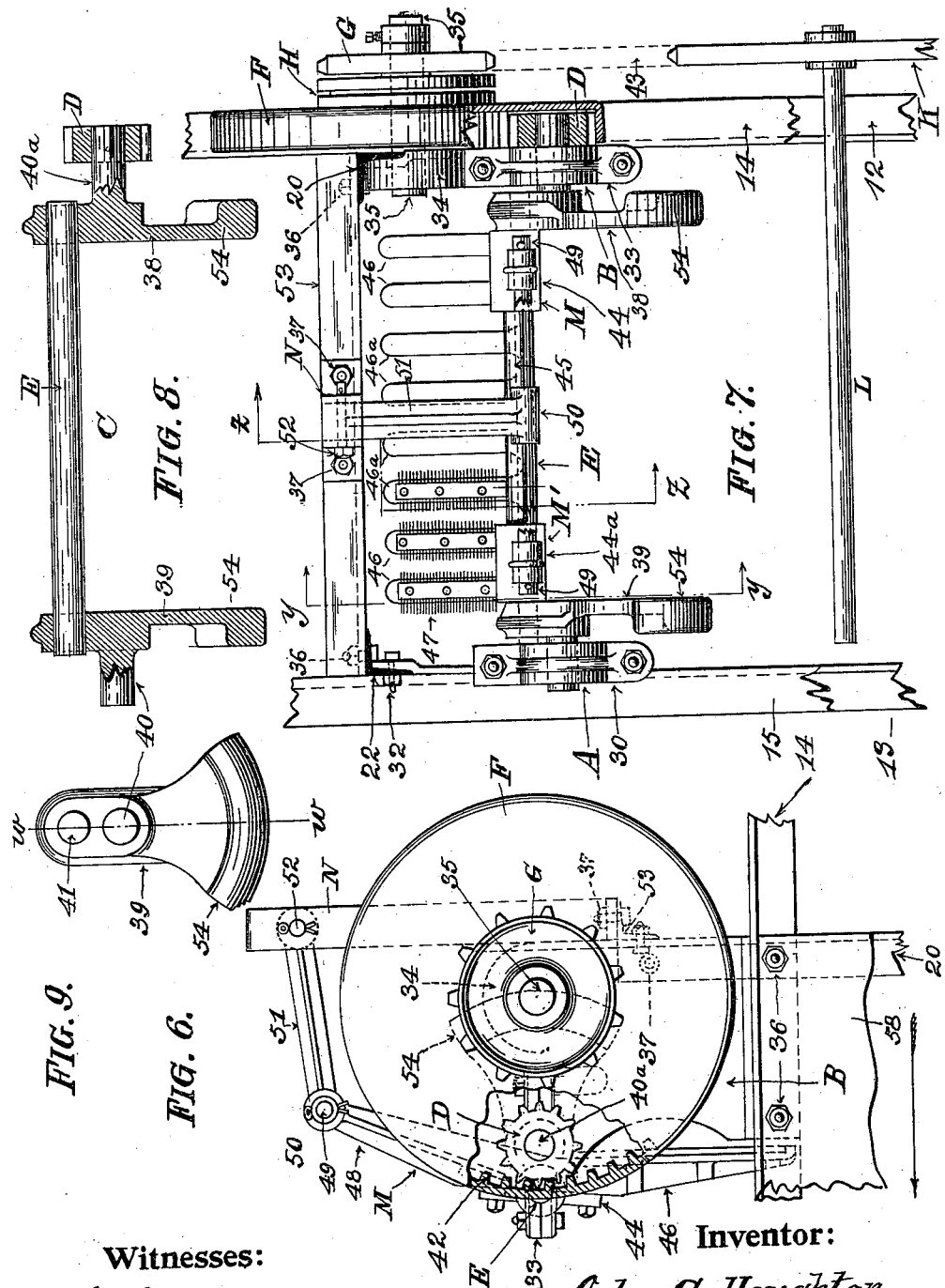

UNITED STATES PATENT OFFICE.

ORLEY C. HOUGHTON, OF CHICAGO, ILLINOIS, ASSIGNOR TO HENRY E. BULLOCK AND JAMES E. BULLOCK, OF CHICAGO, ILLINOIS.

COTTON-HARVESTER.

979,859.  Specification of Letters Patent. Patented Dec. 27, 1910.

Application filed August 1, 1910. Serial No. 574,911.

*To all whom it may concern:*

Be it known that I, ORLEY C. HOUGHTON, a citizen of the United States, and resident of Chicago, in the county of Cook and State of Illinois, have invented certain new and useful Improvements in Cotton-Harvesters; and I do hereby declare that the following description of my said invention, taken in connection with the accompanying sheets of drawings, forms a full, clear, and exact specification, which will enable others skilled in the art to which it appertains to make and use the same.

This invention has general reference to cotton pickers, and especially that class of cotton harvesters in which rotating picking fingers are employed to remove cotton lint from cotton plants while the machine is being moved over or past a row of cotton plants. In this class of cotton harvesters there is, usually, a rotating cylinder including end-plates in which are mounted a series of columns, each column being fitted with a multiplicity of picking fingers, said cylinder rotating continuously while the picking fingers mounted therein rotate intermittently, the dwell in the rotation of the picking fingers being utilized to remove the picked lint from the picking fingers. For this purpose there is in this type of cotton harvesters a stripper comprising a series of rotating star-wheels which remove the cotton lint from the picking fingers while the latter are moving through the spaces between said star-wheels, another set of star-wheels, also entering the spaces between the stripper-star-wheels removing the cotton lint from the spaces between the stripper-star-wheels.

In actual tests made in the cotton fields by me with a machine of the type described, I have found that the peripheral speed of the cleaner is so high that considerable cotton is thrown upwardly and forwardly into the machine body where it interferes with the picking mechanism and causes frequent stoppage and breakage thereof. Attempts have been made to intercept this straying or scattered cotton by placing a fixed grate above the cleaner into the exit passage of the machine, but with only partial success, some of the cotton being pushed through the grate mentioned into the compartment of the machine body in which the cotton picking mechanism is located. This latter objection is a rather serious one, which I have overcome by my present invention which resides broadly speaking, in the introduction, in a cotton harvester of the type described, of reciprocating strippers which engage the picking fingers close to the column and then move approximately the entire length of the picking portion of these fingers, and which throw the cotton lint in an approximately horizontal direction into the container adapted to receive the same. By this construction I also simplify the mechanism of a cotton harvester and materially reduce the power required to operate the machine, this present invention being one of a series in which I have been engaged for several years with the object in view of producing a cotton harvester which, while highly efficient, shall nevertheless be low in cost in order to induce a more general use of this class of cotton pickers to supplant, as far as possible, hand picking.

While this present invention is adapted for use in nearly all of the various styles of cotton pickers in which picking fingers are employed, I have illustrated the preferred embodiment of my invention in connection with the cotton harvester for which Letters Patent of the United States, No. 955,594 were granted April 19, 1910, upon an application filed by me August 7, 1909, Serial No. 511,800, and to which reference may be had for a full disclosure of the general and detail construction of this cotton harvester.

In the drawings already referred to, which serve to illustrate this invention more fully, Figure 1 is a diagrammatic illustration in sectional elevation, the section being on line *y y* of Fig. 7. Fig. 2 is a side elevation of the right-hand side of the machine looking forward, and showing the stripping mechanism in its highest position. Fig. 3 is a view similar to Fig. 1, except that this view is taken on line *z z* of Fig. 7, and shows the stripper in its lowermost position. Fig. 4 is an elevation, partly in section, on line *x x* of Fig. 5, and illustrates the stripper in its extreme rearward position. Fig. 5 is an elevation on line $x^a x^a$ of Fig. 2. Fig. 6 is a side elevation of the device as it appears when seen at the left hand side thereof looking forward of the machine, the latter moving in the direction of the arrow placed near said Fig. 6. Fig. 7 is a plan. Fig. 8 is a sectional plan of the rotating crank shaft, the view being taken on line *w w* of Fig. 9. Fig. 9 is an end elevation of the same.

Like parts are designated by corresponding symbols and characters in all the various figures.

In the drawings the reference numeral 12 designates the lower left hand angle bar, and 14 the upper left hand angle bar looking toward the forward end of the machine, while 13 designates the lower right hand angle bar and 15 the upper corresponding angle bar, these bars forming part of the skeleton frame of the machine body together with vertically disposed angle bars 20, 22, which connect the horizontal angle bars 12 and 14, and 13 and 15 respectively.

Upon the angle bar 15, and at a proper distance from the vertical plane through the center line of the cylinder, there is located a standard A, carrying a capped bearing 30, said standard being bolted to the upper horizontal angle bar 15 by bolts 31, and to the vertical angle bar 22 by bolt 32.

Upon the upper angle bar 14, and in line transversely with the standard A, there is located a companion standard B, having a capped bearing 33, the same as the standard A, and in addition to this bearing it has a bored boss 34, in which there is secured a stud-shaft 35, said standard B being secured to the several angle bars the same as the standard A. In the bearings of these standards rotates a crank shaft C shown in detail in Figs. 8 and 9, said crank shaft comprising two side members 38, 39, having journals 40, 40ª, engaging said bearings 30, 33, the journal 40ª being extended to reach outside of its bearing and there to receive a gear pinion D. The side members 38, 39, are bored at 41, Fig. 9, to receive a shaft E, serving, as it were, as the wrist pin of the crank, the distance from the center of the journals 40 40ª and the center of the wrist pin E determining the throw of the crank.

Upon the stud shaft 35 there is loosely placed an internal gear wheel F, which, with its teeth 42, engages the gear pinion D and thereby rotates the crank shaft C, said internal gear wheel being rotated by means of a sprocket pinion G rotating upon the stud shaft 35, and connecting with the gear wheel F by means of clutch mechanism H, similar in construction to the one shown and described in the Letters Patent heretofore mentioned, so that a detailed view, or a specific description of this clutch mechanism is deemed superfluous.

The sprocket pinion connects, by a link belt 43, (indicated by dotted lines in Fig. 7) with a driver sprocket wheel K, secured to the cylinder shaft L, or from any other part of the cotton picking mechanism from which said sprocket wheel K may be driven.

Upon the wrist pin E there is mounted a stripper or comb, of peculiar construction comprising two end levers M, M', which levers are provided at their middle portion with capped bearings 44, 44ª, said levers M M' being, preferably, permanently connected in spaced relation, by a connecting member 45. This connecting member 45 may be a tube, but I prefer to form the same semi-circular in transverse section, as shown in Figs. 1, 3, 4, 5, and 7, for economic, and other reasons which it is not necessary to mention.

The lower members of the levers M M' are bifurcated at 46, and from the connecting member 45 project downwardly additional members 46ª, parallel with the members 46 and in spaced relation thereto. These downwardly projecting members 46, 46ª, constitute the stripper proper, the outer faces of said bars 46 46ª being provided with brushes 47, if desired, to assist in the removal of the cotton lint from the picking fingers, as will hereinafter more fully appear.

Each of the levers M M' has an upwardly projecting arm 48, 48ª, through the upper end of which is passed a rod 49, which rod connects the two arms 48 48ª, and it has centrally a link connection 50, formed at one end of a link 51, the other end of said link being pivoted in a yoke N, by a pivot bolt 52. This yoke N is bolted to a cross bar 53, secured to the upper ends of the vertical angle bars 20, 22, by bolts 37.

In order to balance the reciprocating and rotating parts of the stripper to avoid undue vibration when these parts are rapidly functioning, there are formed on the crank-members 38 39, counterweights 54, of appropriate bulk and located in proper position, said counterweights being preferably formed integral with the crank members 38, 39, and the journals 40, 40ª thereon.

As heretofore stated, this invention is especially adapted for use in cotton harvesting machines in which intermittently rotating picking fingers are mounted in columns journaled in end plates, said end plates with their series of columns being usually termed "the cylinder", and in Fig. 1 I have illustrated in vertical section such a cylinder, and in Fig. 5 there is shown a fragment thereof. Thus the cylinder comprises the two end plates 55, 56, rotating with the cylinder shaft L to which these end plates are properly secured. In the periphery of these end plates there are journaled the columns P, in each of which there are mounted a series of picking fingers R. When rotating with the cylinder, these picking fingers pass successively through the spaces between the stripping bars 46, 46ª, which stripper bars remove the cotton lint from the picking fingers adhering thereto by a rearward sweep of the stripper bars. This movement of the stripper is rather a complicated one, and is best described as a four-step motion. At first the stripper moves upwardly, then forwardly, then downwardly to step over the series of picking fingers in approaching columns, and then sweeps rearwardly approximately the entire length of the picking portion of said fingers, the last movement being approximately horizontal. The movement of this stripper is so timed (by a proportionate ratio of the gearing that rotates the crank shaft), that it makes one cycle for every set of picking fingers in the cylinder, thus when there are twenty columns in the cylinder and a corresponding series of picking fingers, the stripper will perform twenty cycles for every revolution of the cylinder.

The operation of the picking mechanism is well understood, so that I shall not describe the same in detail. Suffice it to say that the cylinder rotates continuously when in actual use, while the picking fingers rotate intermittently, that is to say there is a cessation of rotation of these picking spindles during part of the rotation of the cylinder, the dwell occurring after the picking fingers have withdrawn from the cotton plants and have passed through the grate U, so that when the fingers reach the stripper, they are at rest with reference to their rotation around their axis. This dwell in the rotation of the picking fingers is essential because as long as the picking fingers are rotating it is difficult to strip the cotton therefrom.

In order to prevent cotton from being scattered there is provided a hood of suitable construction, S, shown in Fig. 1, over the machine body, which conducts the picked lint to a receptacle T, placed upon a platform 57, located at the rear end of the machine, preferably upon the lower horizontal angle bars.

Having thus fully described this invention, I claim as new and desire to secure to myself by Letters Patent of the United States—

1. In a cotton harvester, the combination, of a machine body, cotton picking mechanism located therein including axially rotating picking fingers, said picking fingers revolving in vertical planes parallel with the movement of the machine, and a stripper constructed to remove cotton from the picking fingers, said stripper including a series of reciprocating pivoted bars in spaced relation, said bars having a substantially reciprocatory movement, the picking fingers being constructed to pass through the spaces between said bars while said bars are reciprocating, as set forth.

2. In a cotton harvester, the combination, of a machine body, cotton picking mechanism located therein including axially rotating picking fingers, and a stripper, said stripper including a series of pivoted bars in parallel spaced relation, said bars having a substantially reciprocatory movement, said picking fingers being constructed to pass through the spaces between said bars, and means adapted to reciprocate said bars.

3. In a cotton harvester, the combination, of a machine body, cotton picking mechanism located therein including axially rotating picking fingers, and a stripper, said stripper including a series of pivoted bars in spaced relation, a movable connection to which said bars are pivoted, a crank shaft which said bars are constructed to engage, and means for rotating said crank shaft, whereby a substantially reciprocatory movement is imparted to said bars, said axially rotating picking fingers being constructed to pass through the spaces between said bars, as specified.

4. In a cotton harvester, the combination, of a machine body, cotton picking mechanism located therein including axially rotating picking fingers, and a stripper constructed to remove cotton from said picking fingers, said stripper including a series of bars in parallel spaced relation, said bars having a substantially reciprocatory movement, a crank shaft, said crank shaft having a long wrist pin upon which said bars are journaled, a link to which said bars are connected at one end, a support for the other end of said link, and means adapted to rotate said crank shaft.

5. In a cotton harvester, the combination, of a machine body, cotton picking mechanism located therein including axially rotating picking fingers, and a stripper constructed to remove cotton from said picking fingers, said stripper including a series of bars in spaced relation, said bars having a substantially reciprocatory movement, a crank shaft upon which said bars are journaled, a movable connection to which said bars are pivoted, and means adapted to rotate said crank shaft, said crank shaft being provided with balancing means, said axially rotating picking fingers being constructed to pass through the spaces between said bars, as stated.

6. In a cotton harvester, the combination, of a machine body, cotton picking mechanism located therein, including axially rotating picking fingers, a stripper constructed to remove cotton from said picking fingers included two end levers in spaced relation, means adapted to removably support one end of said end levers, a connecting member for said end levers, a series of bars projecting from said connecting member and bars projecting from said end levers, said bars having a substantially reciprocatory movement, a crank shaft, bearings on said end levers adapted to engage said crank shaft, supports for said crank shaft, and means for rotating said crank shaft.

7. In a cotton harvester, the combination of a machine body, cotton picking mechanism located therein including axially rotating picking fingers, and a pivoted, substantially reciprocatory comb constructed to remove cotton lint from said picking fingers, said comb being constructed to sweep, in stripping said cotton lint from said picking fingers, toward the picking end of said picking fingers and then return to the starting point, said starting point being near the bases of said picking fingers, said picking fingers being adapted to pass through the spaces in said comb, and means constructed to impart said substantially reciprocatory movement to said comb, said latter means including a rotating crank-shaft and means connecting said crank-shaft to said comb.

In testimony that I claim the foregoing as my invention, I have hereunto set my hand in the presence of two subscribing witnesses.

ORLEY C. HOUGHTON.

Witnesses:
MICHAEL J. STARK,
A. G. PETERSON.